(12) United States Patent
Cui et al.

(10) Patent No.: US 12,332,159 B1
(45) Date of Patent: Jun. 17, 2025

(54) TEST DEVICE APPLIED TO COUPLED ENVIRONMENT OF STRESS, WEAR, AND CORROSION, AND QUANTITATIVE EVALUATION METHOD

(71) Applicant: Ocean University of China, Qingdao (CN)

(72) Inventors: Hongzhi Cui, Qingdao (CN); Hongwei Zhang, Qingdao (CN); Guoliang Ma, Qingdao (CN); Hao Chen, Qingdao (CN); Xiyan Lin, Qingdao (CN)

(73) Assignee: Ocean University of China

( * ) Notice: Subject to any disclaimer, the term of this patent is extended or adjusted under 35 U.S.C. 154(b) by 0 days.

(21) Appl. No.: 18/959,935

(22) Filed: Nov. 26, 2024

(30) Foreign Application Priority Data

Dec. 8, 2023 (CN) .......................... 202311681080.7

(51) Int. Cl.
| | | |
|---|---|---|
| G01N 17/00 | (2006.01) |
| G01N 3/08 | (2006.01) |
| G01N 3/14 | (2006.01) |
| G01N 3/56 | (2006.01) |
| G01N 17/02 | (2006.01) |
| G01N 17/04 | (2006.01) |

(52) U.S. Cl.
CPC .............. *G01N 17/002* (2013.01); *G01N 3/08* (2013.01); *G01N 3/14* (2013.01); *G01N 3/56* (2013.01); *G01N 17/006* (2013.01); *G01N 17/02* (2013.01); *G01N 17/04* (2013.01); *G01N 17/043* (2013.01); *G01N 17/046* (2013.01); *G01N 2203/0003* (2013.01); *G01N 2203/0017* (2013.01); *G01N 2203/0035* (2013.01)

(58) Field of Classification Search
CPC ........... G01N 3/14; G01N 3/56; G01N 3/308; G01N 17/002; G01N 17/02; G01N 17/04; G01N 17/043; G01N 17/046; G01N 17/006
See application file for complete search history.

(56) References Cited

U.S. PATENT DOCUMENTS 8,512,535 B2 * 8/2013 Coster .................. G01N 27/416
324/447

FOREIGN PATENT DOCUMENTS

CN 110231280 A * 9/2019

* cited by examiner

*Primary Examiner* — Paul M. West
(74) *Attorney, Agent, or Firm* — Tutunjian & Bitetto, P.C.

(57) ABSTRACT

This application relates to a test device applied to a coupled environment of stress, wear, and corrosion, and a quantitative evaluation method, and belongs to the field of failure analysis of materials. The test device includes a stress-loading mechanism configured to load a stress on a sample, a corrosion mechanism configured to conduct an electrochemical corrosion test on the sample, and a wear mechanism configured to wear a sample. The test device applied to a coupled environment of stress, wear, and corrosion of this application can establish a wear-stress-corrosion coupled action test process, and can investigate service behaviors of various metallic materials and metal matrix composites under conditions close to actual service conditions to obtain key behavior data under a multi-factor coupled action, quantitatively analyze a wear, a corrosion, a wear-corrosion interaction, a stress-wear interaction.

8 Claims, 5 Drawing Sheets

TEST DEVICE APPLIED TO COUPLED ENVIRONMENT OF STRESS, WEAR, AND CORROSION, AND QUANTITATIVE EVALUATION METHOD

CROSS REFERENCE TO RELATED APPLICATION

This patent application claims the benefit and priority of Chinese Patent Application No. 2023116810807, filed with the China National Intellectual Property Administration on Dec. 8, 2023, the disclosure of which is incorporated by reference herein in its entirety as part of the present application.

TECHNICAL FIELD

The present disclosure belongs to the field of failure analysis of materials, and specifically relates to a test device applied to a coupled environment of stress, wear, and corrosion, and a quantitative evaluation method. The present disclosure can achieve not only a test of a damage behavior of a metallic material in a coupled environment of stress, wear, and corrosion, but also the quantitative analysis of impacts of different environmental factors on a damage of a metallic material.

BACKGROUND

When marine engineering equipment is in service in seawater environments, key moving components (such as a buoyancy-adjusting system of a bathyscaphe, a seawater hydraulic transmission system, a stern shaft of a submarine and a sliding support bearing thereof, and an underwater operation manipulator) of marine engineering equipment are subjected not only to corrosion of seawater environments, but also to effects of wear loads and static tensile loads, resulting in a multi-factor coupled damage of a stress-corrosion-wear interaction. Currently, the studies on properties of metallic materials for marine engineering equipment only focus on an action of a single environment or an interacted action of two environments, such as wear, corrosion, fatigue, stress-corrosion cracking, and corrosive wear. There is a lack of a test device and an evaluation method for a service behavior of a metallic material in a stress-wear-corrosion multi-factor coupled environment.

The Chinese patent CN 103926146 A discloses a method and device for evaluating the stress corrosion of a small sample under a constant load. The method and device can be used to test the stress-corrosion cracking resistance of thin-walled tubes and small-size components that cannot be processed into standard samples. According to test results, the applicability of materials of components can be obtained, thereby allowing the material selection and applicability evaluation for the thin-walled tubes and the small-size components. The Chinese patent CN 107478528 A discloses a test method for corrosive wear. This patent provides a test method to simulate corrosive wear service conditions mainly for a dynamic corrosive wear life test under wear and corrosion conditions. This test method can be used to measure an electrochemical corrosive wear during a dynamic corrosive wear test, and can effectively allow the quantitative study of corrosion during a wear process. It can be known that there are currently many test methods for the performance evaluation of materials under an action of a single environmental factor or an interacted action of two environmental factors, including a wear test, a corrosion test, a fatigue test, a C-ring stress-corrosion test or a slow strain rate tensile test, a corrosive wear test, or the like. There have be published patents and national standards for some evaluation methods.

The Chinese patent CN 110940605 A discloses a device for testing a wear-stress-corrosion coupled action on a heat transfer tube and a method for evaluating a service behavior of a heat transfer tube. The device can establish a wear-stress-corrosion coupled action test process, and can investigate a service behavior of a heat transfer tube under conditions close to actual service conditions to obtain key behavior data under a multi-factor coupled action and reveal a failure mechanism of the heat transfer tube under a wear-stress-corrosion coupled action, which provides a basis for the construction of a method for evaluating a service behavior of a heat transfer tube. However, the device and the method cannot simultaneously monitor parameters related to the evaluation of wear and corrosion resistance, such as a friction coefficient, a current, and a potential, and cannot quantitatively measure key environmental factors in a multi-factor coupled environment. Therefore, it is necessary to invent a test device applied to a coupled environment of stress, wear, and corrosion and an evaluation method for quantitatively measuring environmental factors.

SUMMARY

In view of the deficiencies of the prior art, the present disclosure provides a test device applied to a coupled environment of stress, wear, and corrosion, and a quantitative evaluation method.

To achieve the above objective, the present disclosure adopts the following technical solutions:

A test device applied to a coupled environment of stress, wear, and corrosion is provided, including a stress-loading mechanism configured to load a stress on a sample, a corrosion mechanism configured to conduct an electrochemical corrosion test on the sample, and a wear mechanism configured to wear a sample, where the stress-loading mechanism is configured to load the stress on the sample through a spring deformation; the corrosion mechanism includes a corrosion chamber, an opening is formed at a top of the corrosion chamber to facilitate feeding of an electrolyte through the opening and a reciprocating movement of a friction component of the wear mechanism, and a corrosion environment can be changed by adjusting a Cl-concentration and a pH in the electrolyte; and the wear mechanism is configured to wear the sample through a friction wear testing machine, and different wear loads and wear frequencies are applied by the friction wear testing machine. A material can be any metallic material or metal matrix composite.

Preferably, the stress-loading mechanism includes a support frame, a screw, a loading bolt, a loading nut, and a rectangular compression spring; ends of the screw and the loading bolt to be connected with the sample each are provided with a reserved groove; a circular hole is reserved at each of two ends of the sample; the two ends of the sample are inserted into reserved grooves of the screw and the loading bolt, respectively, and the sample is connected with the screw and the loading bolt through a pin;

the rectangular compression spring is arranged between the support frame and the loading nut; a specification of the rectangular compression spring is selected according to an applied stress; and the rectangular compression spring is deformed by tightening the loading nut. A deformation amount is measured according to a displacement distance of the loading nut, and a loaded stress value can be determined according to a Hooke's law.

Preferably, in order to ensure that a sample does not twist during a stress loading process, the loading bolt and the loading nut are processed into hexagonal shapes. Hexagonal holes are formed in the support frame. During installation, the screw and the loading bolt penetrate through the hexagonal holes to allow a fixed connection between an end of the support frame and the two ends of the sample.

Preferably, in a chemical corrosion test process, except for a test surface, remaining surfaces of the sample are insulated and sealed with a rubber stopper; a through hole is formed at each of two sides of the corrosion chamber, and the rubber stopper is arranged in the through hole; and a cuboid is cut out inside each rubber stopper to facilitate the two ends of the sample to penetrate through rubber stoppers, respectively, and edges of the sample and the rubber stoppers are sealed with a sealant.

Reserved holes are formed in a side wall of the corrosion chamber to insert a reference electrode and a counter electrode. The test device of the present disclosure is implemented through a three-electrode system, including a working electrode (the sample itself), the reference electrode, and the counter electrode (an auxiliary electrode).

Preferably, a bottom of the corrosion chamber is provided with a gasket having an appropriate height to guarantee a normal wear process and reduce wear loads borne by two ends of the corrosion chamber, and a material of the gasket is an electrically non-conductive material and preferably a plastic.

Further preferably, the friction wear testing machine includes a grinding ball and clamping mechanism; the grinding ball and clamping mechanism includes a grinding ball, a spring collet (an ER collet), and a sleeve; the grinding ball is arranged in the spring collet, and the grinding ball is fixed by tightening the sleeve; and the grinding ball is in contact with the sample, and is driven by a servo motor to move left and right in a reciprocating manner to wear the sample.

Further preferably, a plurality of and preferably three test devices are arranged to facilitate controlled experiments.

Further preferably, a working process of the test device is as follows:

two ends of a processed sample each are wound with an insulating tape for insulation, and then are arranged in the corrosion chamber; before the installation, the gasket is arranged under the sample, and the two ends of the sample are sealed with the rubber stoppers to avoid leakage of the electrolyte; the reference electrode and the counter electrode are inserted into the reserved holes in the side wall of the corrosion chamber; the screw and the loading bolt are fixed on the support frame; and the two ends of the sample are inserted into the reserved grooves of the screw and the loading bolt, the rectangular compression spring and the loading nut are fixed on the loading bolt successively, and the cylindrical pin is arranged and inserted into circular holes reserved in the screw and the sample; a diameter of each circular hole is the same as a column diameter of the pin;

the three test devices have a same working principle; the three test devices are arranged to implement controlled experiments, and the controlled experiments are conducted successively; the reference electrode and the counter electrode are arranged in the corrosion chambers of the three test devices successively, and a prepared corrosive liquid is injected into the corrosion chambers successively; a wear load and a wear frequency are set for the friction wear testing machine; the grinding ball (a spherical $Si_3N_4$ ceramic ball) is allowed through the friction wear testing machine to move downward to contact the sample, and a load in a downward direction is applied; relative reciprocating sliding between the grinding ball and the sample allows a wear; and as a result, the sample is subjected to a stress action caused by the loading bolt, a corrosion action caused by an environmental medium in the corrosion chamber, and a wearing action caused by reciprocating sliding of the grinding ball, and a damage is caused by a coupled action of stress, wear, and corrosion to the sample.

A quantitative evaluation method for the test device applied to a coupled environment of stress, wear, and corrosion is provided. The quantitative evaluation method is based on a coupled action of stress, wear, and corrosion test constructed by the test device of the present disclosure. In the quantitative evaluation method, based on the corrosive wear model (ASTM G119-09), roles of the following six key environmental factors in the coupled environment are supplemented: influence of a stress on a wear and a corrosion, quantification of a wear and a corrosion, influence of a corrosion on a wear, influence of a wear on a corrosion, influence of a stress on a corrosion, and influence of a stress on a wear. The quantitative evaluation method includes:

(1) using a corrosive wear model (ASTM G119-09) to calculate a total material loss rate $T_{W:C}$, a corrosion-free wear rate $W_0$, a wear-free corrosion rate $C_0$, an action $\Delta W_C$ of a corrosion on a wear rate, and an action $\Delta C_W$ of a wear on a corrosion rate during a wear corrosion; and (2) calculating a total material loss rate $T_{S:W:C}$, an action $\Delta T_S$ of a stress on a wear corrosion, an action $\Delta C_S$ of the stress on a corrosion, and an action $\Delta W_S$ of the stress on a wear under a coupled action of stress, wear, and corrosion.

Preferably, a wear-corrosion interaction in the step (1) meets the following equation:

$$T_{W+C} = W_0 + C_0 + \Delta C_W + \Delta W_C$$

where $$T_{W+C} = \frac{V_{W+C}}{At} \times 24 \times 365;$$

$$W_0 = \frac{V_0}{At} \times 24 \times 365;$$

$$C_0 = \frac{K_1 \times i_C \times EW}{\rho};$$

$$\Delta C_W = C_{W+C} - C_0 = \frac{K_1 \times (i_{W+C} - i_C) \times EW}{\rho};$$

and $$\Delta W_C = T_{W+C} - (W_0 + C_0 + \Delta C_W)$$

where $V_{W+C}$ represents a surface wear volume during a corrosive wear, $mm^3$; $V_0$ represents a surface wear volume during a pure wear, $mm^3$; A represents an area of a sample exposed to a corrosive liquid, $mm^2$; t represents a time of a coupled action, h; $K_1$ represents a constant of $3.27 \times 10^{-3}$ mm·g·$(\mu A \cdot cm \cdot yr)^{-1}$; $i_C$ represents a corrosion current during a pure corrosion, $\mu A \cdot cm^2$; $i_{W+C}$ represents a corrosion current during a corrosive wear, µA·cm$^2$; EW represents an equivalent mass of a sample; and p represents a density of a sample, g·cm$^{-3}$; and if $\Delta C_W > 0$, it indicates that the wear has an accelerating action on the corrosion; if $\Delta C_W < 0$, it indicates that the wear has an inhibiting action on the corrosion; if $\Delta W_C > 0$, it indicates that the corrosion has an accelerating action on the wear; and if $\Delta W_C < 0$, it indicates that the corrosion has an inhibiting action on the wear.

Preferably, a wear-corrosion interaction in the step (2) meets the following equation:

$$T_{S+W+C} = T_{W+C} + \Delta T_S$$

where $$T_{S+W+C} = \frac{V_{S+W+C}}{At} \times 24 \times 365;$$

$$T_{W+C} = \frac{V_{W+C}}{At} \times 24 \times 365;$$

and $$\Delta T_S = T_{S+W+C} - T_{W+C} = \frac{V_{S+W+C} - V_{W+C}}{At} \times 24 \times 365$$

the action $\Delta T_S$ of the stress on the wear corrosion can be divided into an action $\Delta C_S$ of the stress on a wear and an action $\Delta W_S$ of the stress on a corrosion;

$$\Delta C_S = C_{S+W+C} - C_{W+C} = \frac{K_1 \times (i_{S+W+C} - i_{W+C}) \times EW}{\rho};$$

and $$\Delta W_S = \Delta T_S - \Delta C_S$$

where $V_{S+W+C}$ represents a surface wear volume under the coupled action of stress, wear, and corrosion, mm$^3$; and $i_{S+W+C}$ represents a corrosion current under the coupled action of stress, wear, and corrosion, µA·cm$^2$; and if $\Delta C_S > 0$, it indicates that the stress has an accelerating action on the corrosion; if $\Delta C_S < 0$, it indicates that the stress has an inhibiting action on the corrosion; if $\Delta W_S > 0$, it indicates that the stress has an accelerating action on the wear; and if $\Delta W_S < 0$, it indicates that the stress has an inhibiting action on the wear.

Any content not detailed in the present disclosure can refer to the prior art.

The present disclosure has the following beneficial effects:

The test device applied to a coupled environment of stress, wear, and corrosion of the present disclosure can establish a wear-stress-corrosion coupled action test process, and can investigate service behaviors of various metallic materials and metal matrix composites under conditions close to actual service conditions to obtain key behavior data under a multi-factor coupled action, quantitatively analyze a wear, a corrosion, a wear-corrosion interaction, a stress-wear interaction, and a stress-corrosion interaction, and reveal key environmental factors and a damage mechanism of a material under a wear-stress-corrosion coupled action, which provides a basis for the construction of a method for evaluating a service behavior of a material.

BRIEF DESCRIPTION OF THE DRAWINGS

The accompany drawings of the specification constituting a part of the present application provide further understanding of the present application. The schematic embodiments of the present application and description thereof are intended to be illustrative of the present application and do not constitute an undue limitation of the present application.

FIG. 3 shows potentiodynamic polarization curves and corrosion current densities of a titanium alloy sample in the three environments of corrosion, corrosion-wear, and corrosion-wear-stress, where

In the figures, 1: a support frame; 2: a screw; 3: a pin; 4: a corrosion chamber; 5: a reference electrode; 6: a grinding ball and clamping mechanism; 7: a counter electrode; 8: a rectangular compression spring; 9: a loading nut; 10: a loading bolt; 11: a rubber stopper; 12: a gasket; 13: a sample, 14: circular hole and 15: reserved groove.

DETAILED DESCRIPTION OF THE EMBODIMENTS

In order to make those skilled in the art well understand the technical solutions in the specification, the technical solutions in the embodiments of the specification are clearly and completely described below in conjunction with the accompanying drawings in the embodiments of the specification, but are not limited thereto. Those not described in detail in the present disclosure are the conventional techniques in the art.

Example 1

Figure 1:
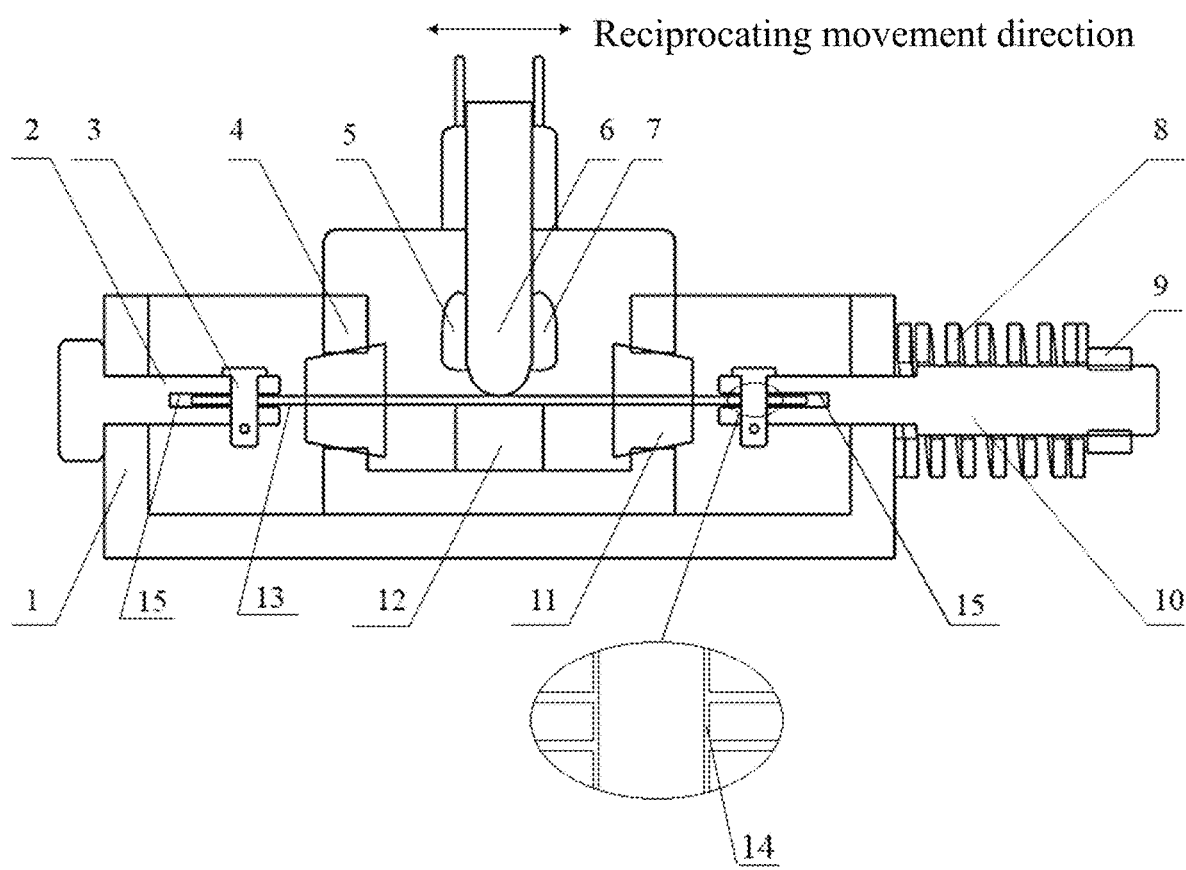
FIG. 1 is a partial cross-sectional view of the test device applied to a coupled environment of stress, wear, and corrosion in the present disclosure.
Figure 2:
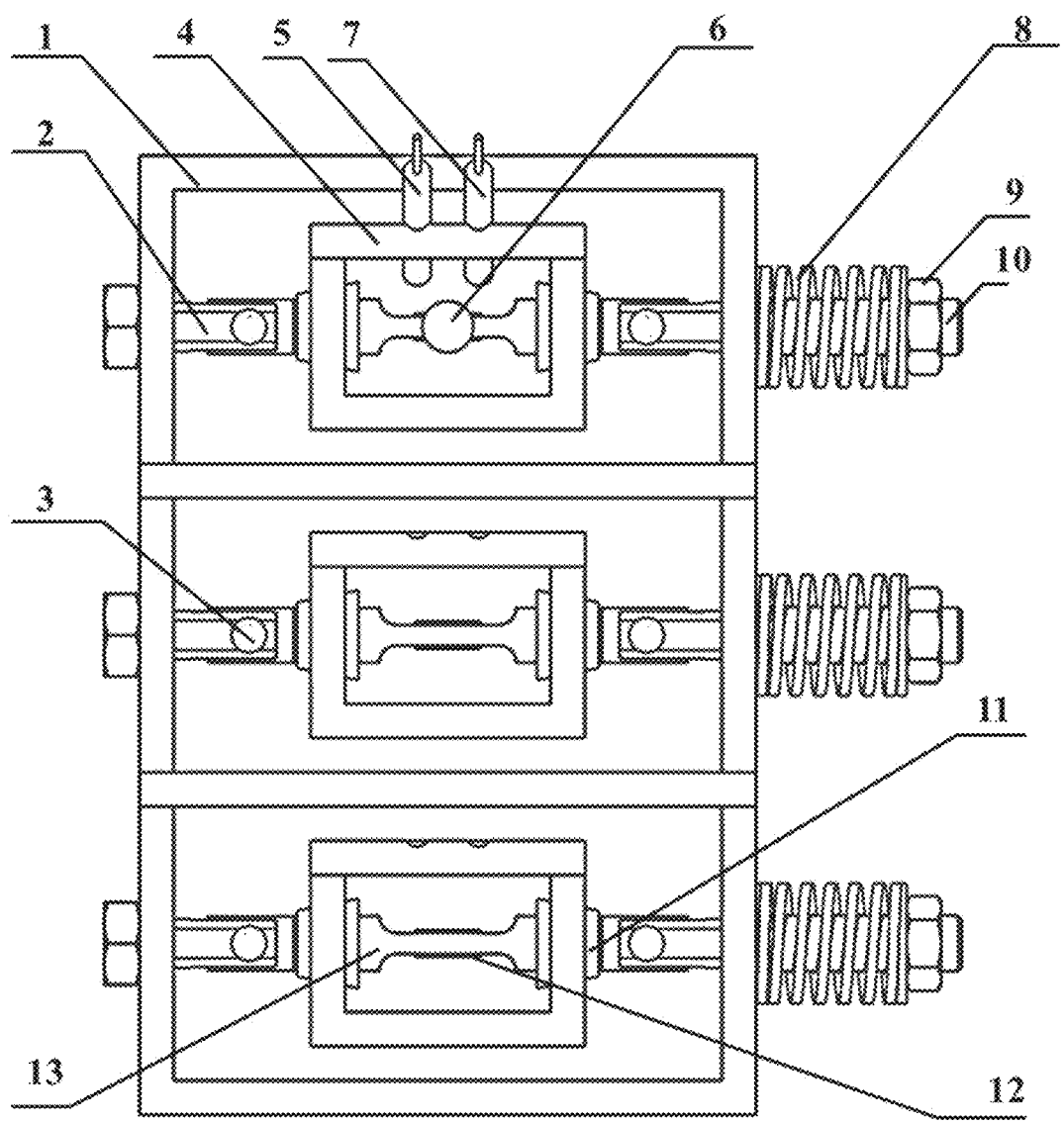
FIG. 2 is a top view of the test device applied to a coupled environment of stress, wear, and corrosion in the present disclosure.

A test device applied to a coupled environment of stress, wear, and corrosion is provided. As shown in FIG. 1 and FIG. 2, the test device includes a stress-loading mechanism configured to load a stress on a sample, a corrosion mechanism configured to conduct an electrochemical corrosion test on the sample, and a wear mechanism configured to wear a sample. The stress-loading mechanism is configured to load the stress on the sample through a spring deformation. The corrosion mechanism includes a corrosion chamber 4. An opening is formed at a top of the corrosion chamber 4 to facilitate feeding of an electrolyte through the opening and a reciprocating movement of a friction component of the wear mechanism, and a corrosion environment can be changed by adjusting a Cl-concentration and a pH in the electrolyte. The wear mechanism is configured to wear the sample through a friction wear testing machine. Different wear loads and wear frequencies are applied by the friction wear testing machine. A material can be any metallic material or metal matrix composite.

The stress-loading mechanism includes a support frame 1, a screw 2, a loading bolt 10, a loading nut 9, and a rectangular compression spring 8. Ends of the screw 2 and the loading bolt 9 to be connected with the sample 13 each are provided with a reserved groove 15. A circular hole 14 is reserved at each of two ends of the sample. The two ends of the sample are inserted into reserved grooves 15 of the screw 2 and the loading bolt 10, respectively, and the sample is connected with the screw and the loading bolt through a pin 3.

The rectangular compression spring 8 is arranged between the support frame 1 and the loading nut 9. A specification of the rectangular compression spring is selected according to an applied stress. The rectangular compression spring 8 is deformed by tightening the loading nut 9. A deformation amount is measured according to a displacement distance of the loading nut, and a loaded stress value can be determined according to a Hooke's law.

In order to ensure that a sample does not twist during a stress loading process, the loading bolt and the loading nut are processed into hexagonal shapes. Hexagonal holes are formed in the support frame 1. During installation, the screw 2 and the loading bolt 10 penetrate through the hexagonal holes to allow a fixed connection between an end of the support frame and the two ends of the sample.

In a chemical corrosion test process, except for a test surface, remaining surfaces of the sample are insulated and sealed with a rubber stopper 11. A through hole is formed at each of two sides of the corrosion chamber 4, and the rubber stopper 11 is arranged in the through hole. A cuboid is cut out inside each rubber stopper 11 to facilitate the two ends of the sample to penetrate through rubber stoppers, respectively, and edges of the sample and the rubber stoppers are sealed with a sealant.

Reserved holes are formed in a side wall of the corrosion chamber 4 to insert a reference electrode 5 and a counter electrode 7. The test device of the present disclosure is implemented through a three-electrode system, including a working electrode (the sample itself), the reference electrode, and the counter electrode (an auxiliary electrode).

A bottom of the corrosion chamber 4 is provided with a gasket 12 having an appropriate height to guarantee a normal wear process and reduce wear loads borne by two ends of the corrosion chamber. A material of the gasket 12 is an electrically non-conductive material and preferably a plastic.

Further preferably, the friction wear testing machine includes a grinding ball and clamping mechanism 6. The grinding ball and clamping mechanism includes a grinding ball, a spring collet (an ER collet), and a sleeve. The grinding ball is arranged in the spring collet. The grinding ball is fixed by tightening the sleeve. The grinding ball is in contact with the sample, and is driven by a servo motor to move left and right in a reciprocating manner to wear the sample.

Further preferably, a plurality of and preferably three test devices are arranged to facilitate controlled experiments.

Further preferably, a working process of the test device is as follows:

Two ends of a processed sample 13 each are wound with an insulating tape for insulation, and then are arranged in the corrosion chamber 4. Before the installation, the gasket 12 is arranged under the sample, and the two ends of the sample are sealed with the rubber stoppers 11 to avoid leakage of the electrolyte. The reference electrode 5 and the counter electrode 7 are inserted into the reserved holes in the side wall of the corrosion chamber 4. The screw 2 and the loading bolt 9 are fixed on the support frame 1. The two ends of the sample are inserted into the reserved grooves 15 of the screw and the loading bolt. The rectangular compression spring 8 and the loading nut 9 are fixed on the loading bolt 10 successively. The cylindrical pin 3 is arranged and inserted into circular holes 14 reserved in the screw and the sample. A diameter of each circular hole 14 is the same as a column diameter of the pin.

The three test devices have a same working principle. The three test devices are arranged to implement controlled experiments, and the controlled experiments are conducted successively. The reference electrode and the counter electrode are arranged in the corrosion chambers of the three test devices successively, and a prepared corrosive liquid is injected into the corrosion chambers successively. A wear load and a wear frequency are set for the friction wear testing machine. The grinding ball (a spherical $Si_3N_4$ ceramic ball) is allowed through the friction wear testing machine to move downward to contact the sample, and a load in a downward direction is applied. Relative reciprocating sliding between the grinding ball and the sample allows a wear. As a result, the sample is subjected to a stress action caused by the loading bolt, a corrosion action caused by an environmental medium in the corrosion chamber, and a wearing action caused by reciprocating sliding of the grinding ball, and a damage is caused by a coupled action of stress, wear, and corrosion to the sample.

Example 2

A quantitative evaluation method of a test device applied to a coupled environment of stress, wear, and corrosion is provided. In this example, a device and method for testing a failure behavior of a titanium matrix composite (Ti6Al4V+2BN produced by laser additive manufacturing) under a multi-factor coupled action (stress-wear-corrosion) is provided. The test device includes a stress-loading mechanism configured to load a stress on a sample, a corrosion mechanism configured to conduct an electrochemical corrosion test on the sample, and a wear mechanism configured to wear a sample.

In this example, a constant load of 300 MPa was applied to a titanium alloy sample for 20 d, a 30 N wear load was applied with a wear frequency of 1 Hz and a sliding distance of 4 mm, and a corrosion environment was 3.5 wt. % NaCl. An exposed area of the sample was 6 mm². A test was conducted for 0.5 h at room temperature. The test device was assembled according to Example 1.

Figure 3A:
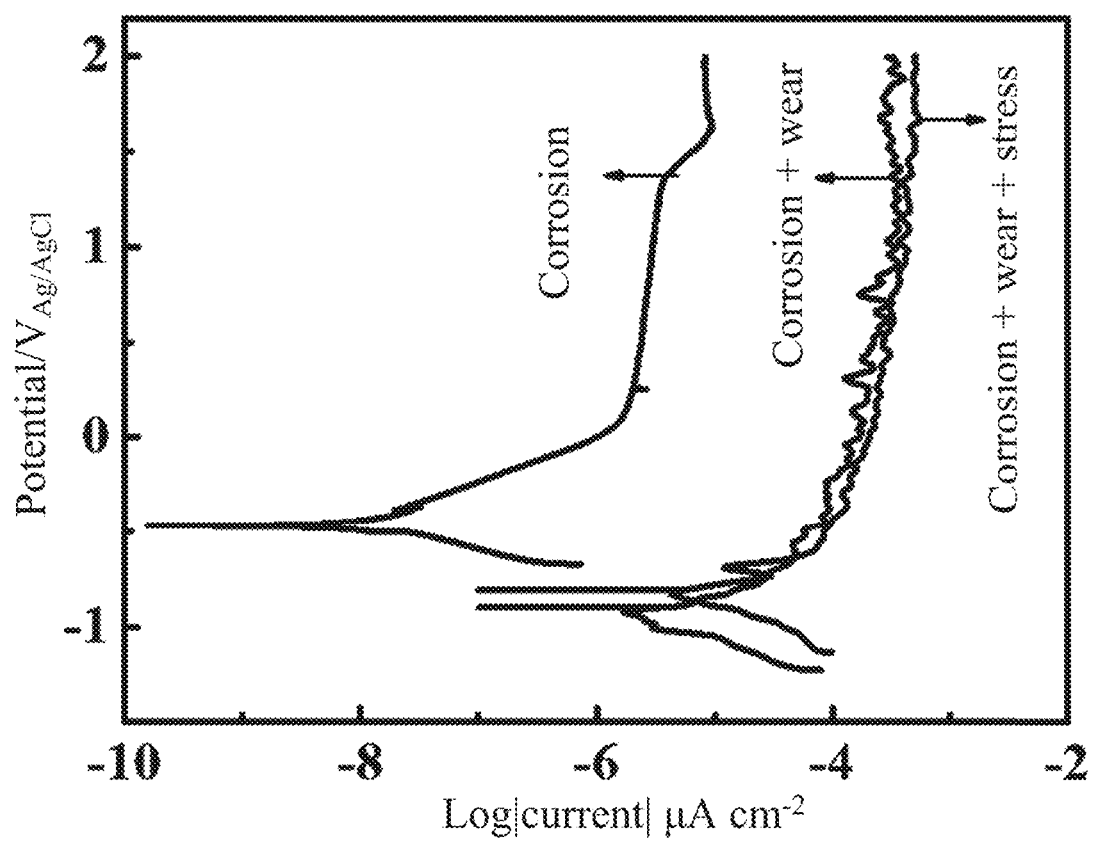
FIG. 3A shows the potentiodynamic polarization curves and FIG. 3B shows the corrosion current densities.
Figure 3B:
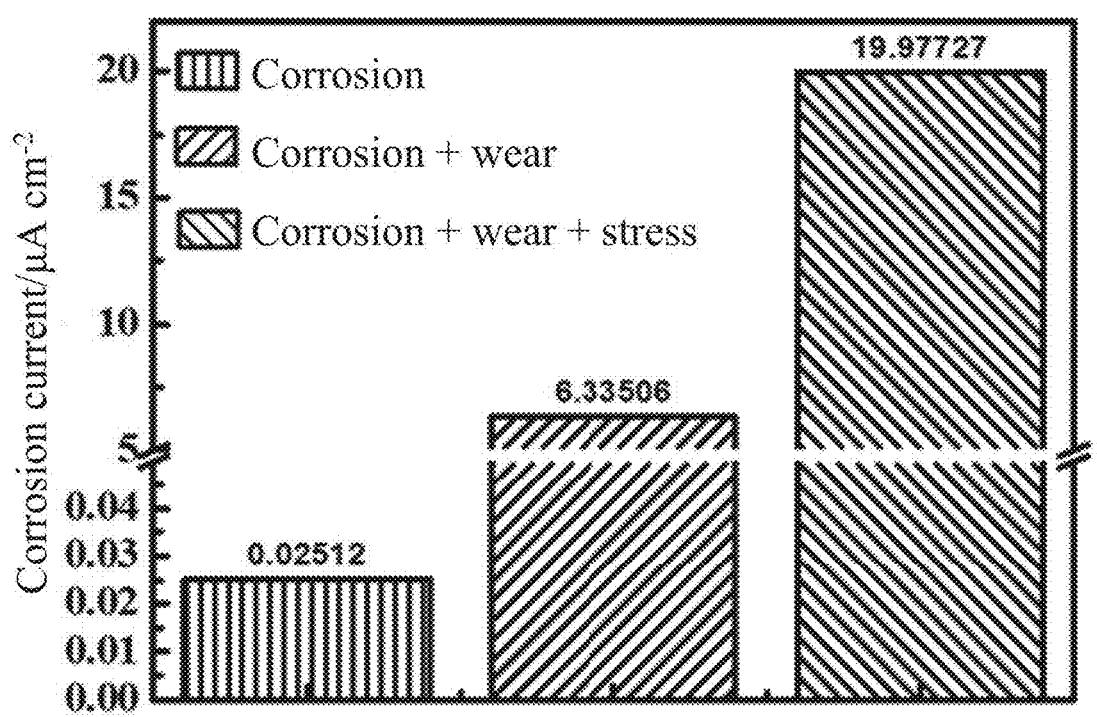
Figure 4:
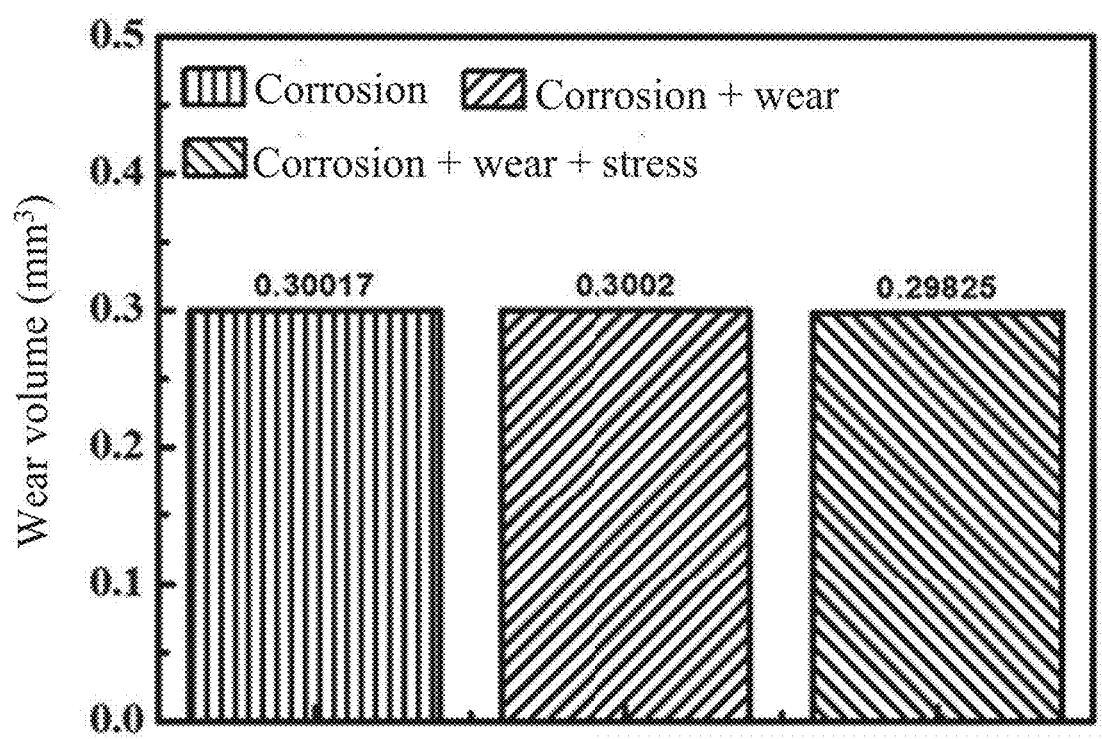
FIG. 4 shows wear volumes of a titanium alloy sample in the three environments of corrosion, corrosion-wear, and corrosion-wear-stress.

During a test process, with an electrochemical workstation, corrosion currents $i_C$, $i_{W+C}$, and $i_{S+W+C}$ under a corrosion action, a wear-corrosion coupled action, and a coupled action of stress, wear, and corrosion were recorded. Potentiodynamic polarization curves and corrosion current densities were shown in FIG. 3. After the test was completed, the sample was taken out from the corrosion environment and tested by a three-dimensional morphology analyzer for surface wear volumes $V_0$, $V_{W+C}$, and $V_{S+W+C}$ (as shown in FIG. 4). $i_C$, $i_{W+C}$, $i_{S+W+C}$, $V_0$, $V_{W+C}$, $V_{S+W+C}$, $K_1$ (3.27×10⁻³ mm g (μA·cm·yr)$^{-1}$), EW (11.98), and ρ (4.89 g·cm$^{-3}$) were substituted into the following equations to quantitatively analyze a wear rate $W_0$, a corrosion rate $C_0$, an action $\Delta W_C$ of a corrosion on a wear rate, an action $\Delta C_W$ of a wear on a corrosion rate, an action $\Delta C_S$ of a stress on a corrosion rate, and an action $\Delta W_S$ of a stress on a wear rate:

$$W_0 = \frac{V_0}{At} \times 24 \times 365 =$$

$$\frac{0.300174}{6 \times 0.5} \times 24 \times 365 = 876.508 \text{ mm} \cdot \text{yr}^{-1} = 876508 \text{ μm} \cdot \text{yr}^{-1};$$

$$T_{W+C} = \frac{V_{W+C}}{At} \times 24 \times 365 =$$

$$\frac{0.3002}{6 \times 0.5} \times 24 \times 365 = 876.584 \text{ mm} \cdot \text{yr}^{-1} = 876584 \text{ μm} \cdot \text{yr}^{-1};$$

$$T_{S+W+C} = \frac{V_{S+W+C}}{At} \times 24 \times 365 =$$

$$\frac{0.298248}{6 \times 0.5} \times 24 \times 365 = 870.884 \text{ mm} \cdot \text{yr}^{-1} = 870884 \text{ μm} \cdot \text{yr}^{-1};$$

$$C_0 = \frac{K_1 \times i_C \times EW}{\rho} =$$

$$\frac{0.00327 \times 0.02512 \times 11.98}{4.89} = 0.00020 \text{ mm} \cdot \text{yr}^{-1} = 0.20 \text{ μm} \cdot \text{yr}^{-1};$$

$$\Delta C_W = C_{W+C} - C_0 =$$

$$\frac{K_1 \times (i_{W+C} - i_C) \times EW}{\rho} = \frac{0.00327 \times (6.33506 - 0.02512) \times 11.98}{4.89} =$$

$$0.050549 \text{ mm} \cdot \text{yr}^{-1} = 50.55 \text{ μm} \cdot \text{yr}^{-1};$$

$$\Delta W_C = T_{W+C} - (W_0 + C_0 + \Delta C_W) =$$

$$876584 - (876508 + 0.20 + 50.55) = 25.25 \text{ μm} \cdot \text{yr}^{-1};$$

$$\Delta T_S = T_{S+W+C} - T_{W:C} = 870884 - 876584 = -5700 \text{ μm} \cdot \text{yr}^{-1};$$

$$\Delta C_S = C_{S+W+C} - C_{W+C} =$$

$$\frac{K_1 \times (i_{S+W+C} - i_{W+C}) \times EW}{\rho} = \frac{0.00327 \times (19.97727 - 6.33506) \times 11.98}{4.89} =$$

$$0.109290 \text{ mm} \cdot \text{yr}^{-1} = 109.29 \text{ μm} \cdot \text{yr}^{-1}; \text{ and}$$

$$\Delta W_S = \Delta T_S - \Delta C_S = -5700 - 109.29 = -5809.29 \text{ μm} \cdot \text{yr}^{-1}.$$

The above results indicate that the wear has an accelerating action on the corrosion and the corrosion has an accelerating action on the wear; and the stress has an accelerating action on the corrosion and the stress has an inhibiting action on the wear.

The above are preferred implementations of the present disclosure. It should be noted that a person of ordinary skill in the art may further make several improvements and modifications without departing from the principle of the present disclosure, but such improvements and modifications should also be deemed as falling within the protection scope of the present disclosure.

What is claimed is:

1. A test device applied to a coupled environment of stress, wear, and corrosion, comprising:
    a stress-loading mechanism configured to load a stress on a sample through a spring deformation, the stress-loading mechanism comprising:
        a support frame;
        a screw;
        a loading bolt, ends of the screw and the loading bolt being connected with the sample are each provide with a reserved groove, wherein a circular hole is reserved at each of two ends of the sample such that the two ends of the sample are inserted into reserved grooves of the screw and the loading bolt, respectively, and the sample is connected with the screw and the loading bolt through a pin;
        a loading nut; and
        a rectangular compression spring arranged between the support frame and the loading nut, where the rectangular compression spring is selected according to an applied stress and is deformed by tightening the loading nut;
    a corrosion mechanism configured to conduct an electrochemical corrosion test on the sample, the corrosion mechanism comprises a corrosion chamber, and an opening is formed at a top of the corrosion chamber to facilitate feeding of an electrolyte and a reciprocating movement of a friction component of a wear mechanism through the opening; and
    the wear mechanism configured to wear a sample through a friction wear testing machine.

2. The test device applied to a coupled environment of stress, wear, and corrosion according to claim 1, further comprising hexagonal holes are formed in the support frame, the screw and the loading nut have hexagonal shapes such that during installation, the screw and the loading bolt penetrate through the hexagonal holes to allow a fixed connection between an end of the support frame and the two ends of the sample.

3. The test device applied to a coupled environment of stress, wear, and corrosion according to claim 2, wherein in a chemical corrosion test process, except for a test surface, remaining surfaces of the sample are insulated and sealed with a rubber stopper;
    a through hole is formed at each of two sides of the corrosion chamber, and the rubber stopper is arranged in the through hole such that the two ends of the sample penetrate through rubber stoppers, respectively, and edges of the sample and the rubber stoppers are sealed with a sealant;
    reserved holes are formed in a side wall of the corrosion chamber to insert a reference electrode and a counter electrode; and
    a bottom of the corrosion chamber is provided with a gasket to reduce wear loads borne by two ends of the corrosion chamber, and a material of the gasket is an electrically non-conductive material and preferably a plastic.

4. The test device applied to a coupled environment of stress, wear, and corrosion according to claim 3, wherein the friction wear testing machine comprises:
    a grinding ball and clamping mechanism that further comprises
        a grinding ball;
        a spring collet, the grinding ball being arranged in the spring collet; and
        a sleeve, the grinding ball being fixed by tightening the sleeve;
    wherein the grinding ball is in contact with the sample, and is driven by a servo motor to move left and right in a reciprocating manner to wear the sample.

5. A quantitative evaluation method for the test device according to claim 1 as applied to a coupled environment of stress, wear, and corrosion comprising:
    winding each of two ends of a processed sample with an insulating tape for insulation, arranging the processed sample in a corrosion chamber;
before installation, arranging a gasket under the sample, and sealing the two ends of the sample with rubber stoppers to avoid leakage of an electrolyte;
inserting a reference electrode and a counter electrode into reserved holes in a side wall of the corrosion chamber;
a screw and a loading bolt are fixed on a support frame;
inserting the two ends of the sample into reserved grooves of the screw and the loading bolt, and
fixing a rectangular compression spring and a loading nut on the loading bolt successively, and arranging and inserting a pin into circular holes reserved in the screw and the sample, a diameter of each circular hole is the same as a column diameter of the pin.

6. The quantitative evaluation method according to claim 5, comprising:
 (A) using a corrosive wear model to calculate a total material loss rate $T_{W+C}$, a corrosion-free wear rate $W_0$, a wear-free corrosion rate $C_0$, an action $\Delta W_C$ of a corrosion on a wear rate, and an action $\Delta C_W$ of a wear on a corrosion rate during a wear corrosion; and
 (B) calculating a total material loss rate $T_{S+W+C}$, an action $\Delta T_S$ of a stress on a wear corrosion, an action $\Delta C_S$ of the stress on a corrosion, and an action $\Delta W_S$ of the stress on a wear under a coupled action of stress, wear, and corrosion.

7. The quantitative evaluation method according to claim 6, wherein a wear-corrosion interaction in step (A) meets the following equation:

$$T_{W+C} = W_0 + C_0 + \Delta C_W + \Delta W_C$$

where $$T_{W+C} = \frac{V_{W+C}}{At} \times 24 \times 365;$$

$$W_0 = \frac{V_0}{At} \times 24 \times 365;$$

$$C_0 = \frac{K_1 \times i_C \times EW}{\rho};$$

$$\Delta C_W = C_{W+C} - C_0 = \frac{K_1 \times (i_{W+C} - i_C) \times EW}{\rho};$$

and $$\Delta W_C = T_{W+C} - (W_0 + C_0 + \Delta C_W)$$

wherein $V_{W+C}$ represents a surface wear volume during a corrosive wear, mm³; $V_0$ represents a surface wear volume during a pure wear, mm³; A represents an area of a sample exposed to a corrosive liquid, mm²; t represents a time of a coupled action, h; $K_1$ represents a constant of 3.27×10⁻³ mm·g·(µA·cm·yr)⁻¹; $i_C$ represents a corrosion current during a pure corrosion, µA·cm²; $i_{W+C}$ represents a corrosion current during a corrosive wear, µA·cm²; EW represents an equivalent mass of a sample; and ρ represents a density of a sample, g·cm⁻³; and if $\Delta C_W > 0$, it indicates that the wear has an accelerating action on the corrosion; if $\Delta C_W < 0$, it indicates that the wear has an inhibiting action on the corrosion; if $\Delta W_C > 0$, it indicates that the corrosion has an accelerating action on the wear; and if $\Delta W_C < 0$, it indicates that the corrosion has an inhibiting action on the wear.

8. The quantitative evaluation method according to claim 7, wherein a wear-corrosion interaction in the calculating a total material loss rate $T_{S+W+C}$, meets the following equation:

$$T_{S+W+C} = T_{W+C} + \Delta T_S$$

where $$T_{S+W+C} = \frac{V_{S+W+C}}{At} \times 24 \times 365;$$

$$T_{W+C} = \frac{V_{W+C}}{At} \times 24 \times 365; \text{ and}$$

and $$\Delta T_S = T_{S+W+C} - T_{W+C} = \frac{V_{S+W+C} - V_{W+C}}{At} \times 24 \times 365$$

the action $\Delta T_S$ of the stress on the wear corrosion is divided into an action $\Delta C_S$ of the stress on a wear and an action $\Delta W_S$ of the stress on a corrosion;

$$\Delta C_S = C_{S+W+C} - C_{W+C} = \frac{K_1 \times (i_{S+W+C} - i_{W+C}) \times EW}{\rho};$$

and $$\Delta W_S = \Delta T_S - \Delta C_S$$

wherein $V_{S+W+C}$ represents a surface wear volume under the coupled action of stress, wear, and corrosion, mm³; and $i_{S+W+C}$ represents a corrosion current under the coupled action of stress, wear, and corrosion, µA·cm²; and if $\Delta C_S > 0$, it indicates that the stress has an accelerating action on the corrosion; if $\Delta C_S < 0$, it indicates that the stress has an inhibiting action on the corrosion; if $\Delta W_S > 0$, it indicates that the stress has an accelerating action on the wear; and if $\Delta W_S < 0$, it indicates that the stress has an inhibiting action on the wear.

* * * * *